(12) United States Patent
Schwarz et al.

(10) Patent No.: US 10,704,989 B2
(45) Date of Patent: *Jul. 7, 2020

(54) GAS TURBINE ENGINE WITH LIFING CALCULATIONS BASED UPON ACTUAL USAGE

(71) Applicant: United Technologies Corporation, Farmington, CT (US)

(72) Inventors: Frederick M. Schwarz, Glastonbury, CT (US); Marnie A. Rizo, Simsbury, CT (US); David P. Houston, Glastonbury, CT (US); David M. Nissley, Marlborough, CT (US); Paul J. Hiester, Glastonbury, CT (US); Timothy Dale, Manchester, CT (US); Timothy B. Winfield, Manchester, CT (US); Madeline Campbell, Vernon, CT (US); James R. Midgley, Cromwell, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,760

(22) Filed: Feb. 1, 2019

(65) Prior Publication Data

US 2019/0219484 A1    Jul. 18, 2019

Related U.S. Application Data

(63) Continuation of application No. 15/161,323, filed on May 23, 2016, now Pat. No. 10,234,359.

(51) Int. Cl.
*G06F 11/00* (2006.01)
*G01M 15/14* (2006.01)
(Continued)

(52) U.S. Cl.
CPC ............. *G01M 15/14* (2013.01); *B64D 27/10* (2013.01); *F02C 9/00* (2013.01); *G05B 23/0283* (2013.01);
(Continued)

(58) Field of Classification Search
CPC .................................................... G01M 15/14
See application file for complete search history.

(56) References Cited

U.S. PATENT DOCUMENTS

| 5,042,295 A | 8/1991 | Seeley |
| 6,343,251 B1 | 1/2002 | Herron et al. |

(Continued)

FOREIGN PATENT DOCUMENTS

| WO | 01/46014 A1 | 6/2001 |
| WO | 2015086957 A1 | 6/2015 |

OTHER PUBLICATIONS

European Search Report for European Application No. 17172582.3 dated Oct. 18, 2017.

(Continued)

*Primary Examiner* — Phuong Huynh
(74) *Attorney, Agent, or Firm* — Carlson, Gaskey & Olds, P.C.

(57) ABSTRACT

A method of monitoring a gas turbine engine includes the steps of: (a) receiving information from actual flights of an aircraft including an engine to be monitored, and including at least one of the ambient temperature at takeoff, and internal engine pressures, temperatures and speeds; (b) evaluating the damage accumulated on an engine component given the data received in step (a); (c) storing the determined damage from step (b); (d) repeating steps (a)-(c); (e) recommending a suggested future use for the component based upon steps (a)-(d). A system is also disclosed.

21 Claims, 6 Drawing Sheets

(51) Int. Cl.
  *F02C 9/00* (2006.01)
  *G05B 23/02* (2006.01)
  *B64D 27/10* (2006.01)

(52) U.S. Cl.
  CPC .... *F05D 2220/323* (2013.01); *F05D 2230/72* (2013.01); *F05D 2260/80* (2013.01); *F05D 2260/82* (2013.01); *F05D 2260/94* (2013.01)

(56) References Cited

U.S. PATENT DOCUMENTS

| | | |
|---|---|---|
| 6,408,258 B1 | 6/2002 | Richer |
| 6,618,654 B1 | 9/2003 | Zaat |
| 6,636,813 B1 | 10/2003 | Isobe et al. |
| 6,671,614 B2 | 12/2003 | Weisman, II et al. |
| 7,433,789 B1 | 10/2008 | Balestra |
| 7,810,385 B1 | 10/2010 | Marcus |
| 7,822,577 B2 | 10/2010 | Sathyanarayana et al. |
| 9,200,984 B2 | 12/2015 | Green et al. |
| 10,234,359 B2 * | 3/2019 | Schwarz ................ B64D 27/10 |
| 2005/0085989 A1 | 4/2005 | Martin |
| 2006/0116847 A1 | 6/2006 | Augustus et al. |
| 2006/0265183 A1 | 11/2006 | Jacques et al. |
| 2007/0272018 A1 | 11/2007 | Shadman et al. |
| 2009/0314100 A1 | 12/2009 | Myers |
| 2010/0153080 A1 | 6/2010 | Khan et al. |
| 2011/0137575 A1 | 6/2011 | Ashok |
| 2015/0227659 A1 | 8/2015 | Andersson et al. |

OTHER PUBLICATIONS

Broede, J. and Pfoertner, H. (1997). OLMOS in GAF MRCA Tornado—10 Years of Experience with On-Board Life Usage Monitoring. 33rd AIAA/ASME/SAE/ASEE Joint Propulsion Conference & Exhibit. vol. AIAA 97-2905. Jul. 6-9, 1997. pp. 1-12.

* cited by examiner

GAS TURBINE ENGINE WITH LIFING CALCULATIONS BASED UPON ACTUAL USAGE

CROSS-REFERENCE TO RELATED APPLICATIONS

This application is a continuation of U.S. patent application Ser. No. 15/161,323 filed May 23, 2016.

BACKGROUND OF THE INVENTION

This application relates to a method and system for providing more accurate lifing estimates of components of a gas turbine engine based upon actual usage, and further providing the ability to recommend future uses to maximize the value of the remaining life.

Gas turbine engines are known and typically include a fan delivering air into a compressor, where it is compressed, and then delivered into a combustor. The air is mixed with fuel and ignited. Products of this combustion pass downstream over turbine rotors, driving them to rotate. The turbine rotors, in turn, rotate the compressor and fan rotors.

As is known, a number of components in the gas turbine engine have a useful operating life or a published life which is limited due to the damage accumulated on the components. As an example, the discs in the compressor and a number of components in the turbine section have limited lives. Regulatory authorities require a number of "cycles" be provided (published) for each disk component per the applicable regulation(s). Operators of aircraft including the particular engines count the number of flight cycles, and remove components for replacement once the useful operating life or published life cycles has been reached. The component lifing may include the impact of repairs to extend the useful life.

Typically, the cyclic lives for components have been set conservatively and based upon one or a few design flight cycles. And all flights of all aircraft are counted as "one" cycle.

Each flight includes a speed increase at takeoff, which rapidly applies stresses on the rotating parts. Then, there is climb which is also relatively high power, cruise at altitude which is relatively low power, and then landing and a thrust reverse to stop movement of the aircraft.

However, all flights are not equal. The damage accumulated on the components is different for different flights.

SUMMARY OF THE INVENTION

In a featured embodiment, a method of monitoring a gas turbine engine includes the steps of: (a) receiving information from actual flights of an aircraft including an engine to be monitored, and including at least one of the ambient temperature at takeoff, and the internal engine pressures, temperatures and speeds; (b) evaluating the damage accumulated on an engine component given the data received in step (a); (c) storing the determined damage from step (b); (d) repeating steps (a)-(c); (e) recommending a suggested future use for the component based upon steps (a)-(d).

In another embodiment according to the previous embodiment, the information received at step (a) is received remotely at a ground-based evaluation location.

In another embodiment according to any of the previous embodiments, the information is streamed off of the aircraft to the ground-based location.

In another embodiment according to any of the previous embodiments, the information is recorded substantially continuously during a flight onboard the aircraft, and received from the aircraft at a later time.

In another embodiment according to any of the previous embodiments, the recommended future use is replacement or repair.

In another embodiment according to any of the previous embodiments, the recommended future use includes a suggestion to utilize a particular component or engine on a particular type flight.

In another embodiment according to any of the previous embodiments, the particular type flight is on an engine having a different thrust rating than a current use of the component.

In another embodiment according to any of the previous embodiments, the particular flight is for use on an aircraft flying routes having distinct different ambient temperatures.

In another embodiment according to any of the previous embodiments, a component other than the component being monitored is evaluated along with the component being monitored to identify the suggested future use.

In another embodiment according to any of the previous embodiments, the storing of step (c) is supplemented to provide information on missing flights.

In another embodiment according to any of the previous embodiments, the supplementation is provided by a conservative nominal predicted cycle.

In another embodiment according to any of the previous embodiments, actual flight data information is evaluated to develop algorithms that can then be utilized at step (b) to predict the actual damage on the component being monitored.

In another embodiment according to any of the previous embodiments, a maintenance facility receives the suggested future use and takes an action on the component.

In another embodiment according to any of the previous embodiments, the action is reported back to be stored and utilized at least in step (e).

In another embodiment according to any of the previous embodiments, steps (a)-(e) are performed on an aircraft including the engine being monitored.

In another embodiment according to any of the previous embodiments, the engine component is an engine life limited part.

In another featured embodiment, a system has a ground-based evaluation system programmed to perform the following steps: (a) receiving information from actual flights of an aircraft including an engine to be monitored, and including at least one of the ambient temperature at takeoff, and the internal engine pressures, temperatures and speeds; (b) evaluating the damage accumulated on an engine component given the data received in step (a); (c) storing the determined damage from step (b); (d) repeating steps (a)-(c); (e) recommending a suggested future use for the component based upon steps (a)-(d).

In another embodiment according to the previous embodiment, the recommended future use is replacement or repair.

In another embodiment according to any of the previous embodiments, the recommended future use includes a suggestion to utilize a particular component or engine on a particular type flight.

In another embodiment according to any of the previous embodiments, a component other than the component being monitored is evaluated along with the component being monitored to identify the suggested future use.

In another embodiment according to any of the previous embodiments, actual flight data information is evaluated to develop algorithms that can then be utilized at step (b) to predict the actual stress on each particular component being monitored.

In another embodiment according to any of the previous embodiments, an action taken based upon the suggested future use is reported to the ground-based evaluation system, stored and used at least in performing step (e).

In another embodiment according to any of the previous embodiments, steps (a)-(e) are performed on an aircraft including the engine being monitored.

In another embodiment according to any of the previous embodiments, the engine component is an engine life limited part.

In another embodiment according to any of the previous embodiments, the evaluation system is ground based.

These and other features may be best understood from the following drawings and specification.

DETAILED DESCRIPTION

Figure 1:
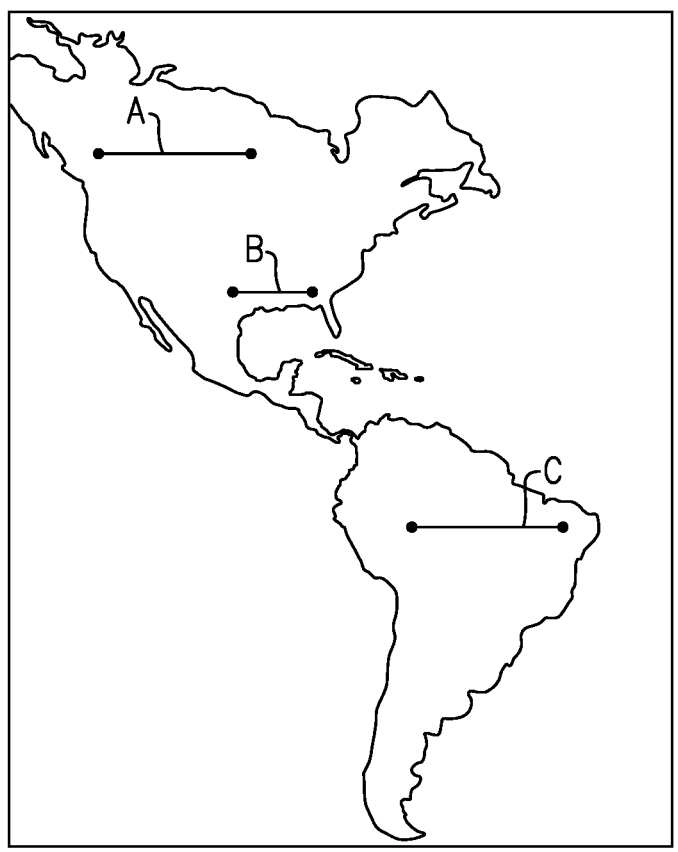
FIG. 1 shows a number of possible flight scenarios.

FIG. 1 is a map showing the Americas. Three sample flights are illustrated. Flight A is in a cold environment and for a relatively long distance. Flight B is over a shorter distance. Flight C is over a distance which is long and in a relatively hot area closer to the equator.

The prior art would assign the same amount of "damage", one cycle, to life limited components for each of Flights A, B, and C.

However, applicant has recognized that there may be greater damage accumulated on aircraft engine components for the longer flights A and C than for the shorter flight B. This is because the aircraft typically carries greater weight and fuel. Thus, such flights use an engine that develops a good deal more thrust. The greater thrust provides a different amount of damage to aircraft engine components than would be the case for the flight B. Of course, these are examples only. A flight between continents could provide different damage accumulation.

In addition, the flight C in a relatively hot area may result in more damage accumulation on aircraft engine components than would the flight A or B in relatively cooler areas.

As an example, temperatures within the gas turbine engine vary by multiples of degrees for each increased degree in ambient temperature. Again, under the prior art, the effect of each of the flights would be taken conservatively and, thus, the lesser damage caused by a flight such as flight B would be "over credited" as against the life of an engine component.

Figure 2:
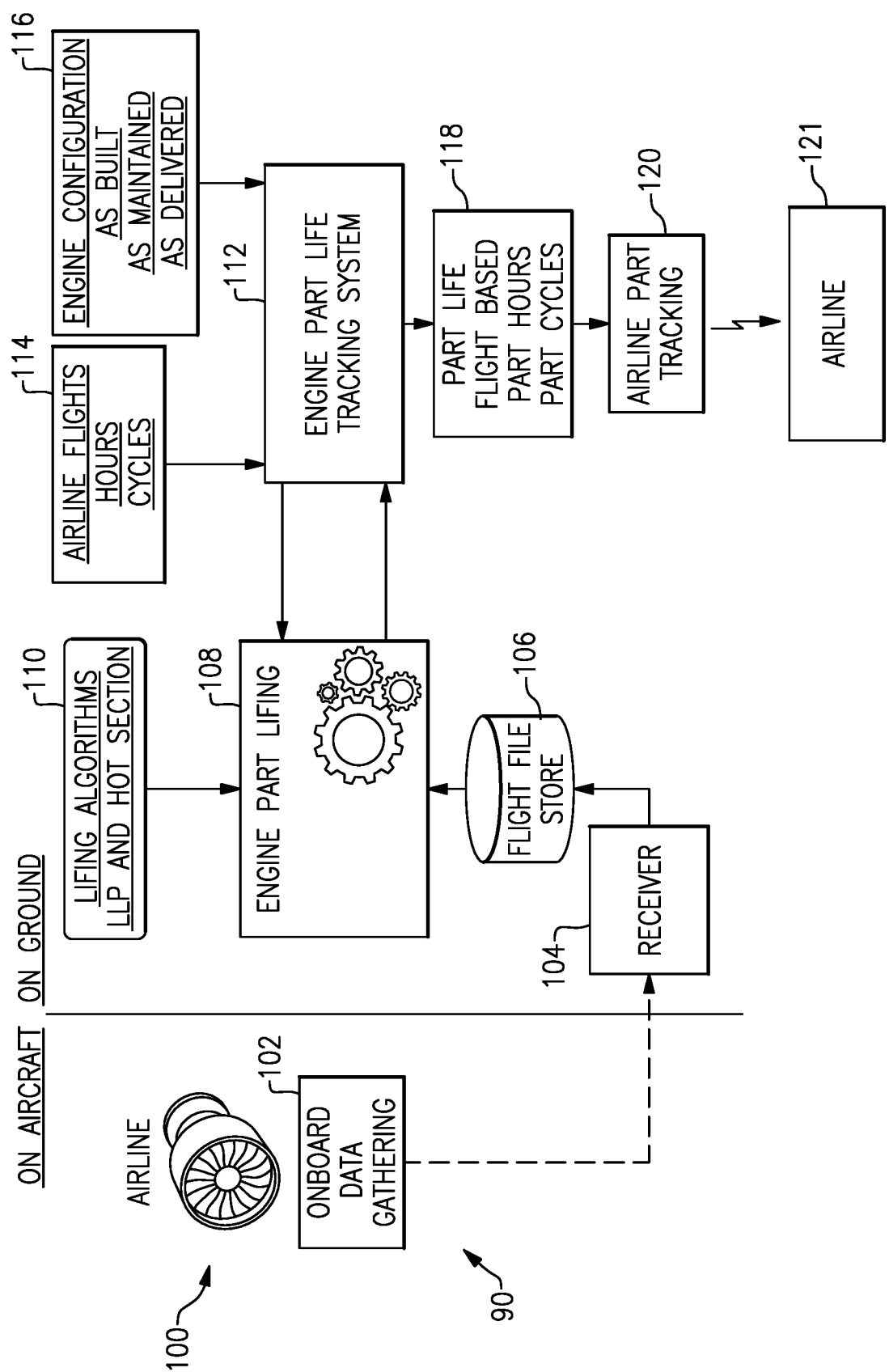
FIG. 2 is a schematic of an aircraft and a monitoring system.

FIG. 2 shows a system 90 for evaluating the remaining life for components on an aircraft engine 100. As the aircraft operates an on-board data gathering system 102 gathers a good deal of relative information relative to the operation of the aircraft. In particular, ambient temperature and temperature at several locations across the aircraft engine are taken. Moreover, the internal pressures and speeds associated with each of the components are also all stored.

While FIG. 1 and the illustrated system take information from an aircraft to a ground based evaluation system 90, it is also contemplated that the system 90 could actually be included on the aircraft.

This information is transferred to a receiver system 104 which may be on the ground. The transmission may be streamed off the aircraft in real time to ground based systems. Alternatively, the information may be sent to the receiver 104 when the aircraft is on the ground.

The files from each flight are stored at 106 and provided to an analytic system 108, which will predict the effect of each flight on the expected life of each component. Lifing algorithms are provided to the analysis system 108 from stored lifing algorithms 110. The lifing algorithms are developed in a manner to be disclosed below.

The information from the analytic system 108 is provided to an engine part lifing tracking system 112, which maintains all of the information gathered for each of the components on each aircraft associated with a particular aircraft operator. Further provided to the system 112 are the airline flights, including the hours and cycles for each aircraft along with the location for which the routes would be operated. As an example, step 114 would provide information with regard to flights that are across a route between two locations which are typically cooler as compared to locations which are typically hotter.

In addition, at 116, engine configurations are provided to the system 112. System 112 maintains the status of each of the components on each of the engines on each of the aircrafts operated by a particular airline. This would be as the engine was initially built and would be updated as it is maintained. As an example, should replacement parts substitute out a part on a particular engine, the storage system at 116 would be updated and would provide the information to the system 112.

At step 118, a course of action can be suggested based upon remaining part hours and the operating cycle on each component. This would allow an airline to monitor the operation of each of its engines and suggest change out of parts to a particular engine on a particular aircraft flying a particular route at step 120. This can be transmitted to an airline or other maintenance entity at step 121. The suggested change may then occur. Once a change does occur, that change is sent back through step 116 to update the information stored in system 112.

Of course, items 104, 106, 108, 110, 112, 114, 116 and outputs 118 and 120 may be within a single computer.

Figure 3:
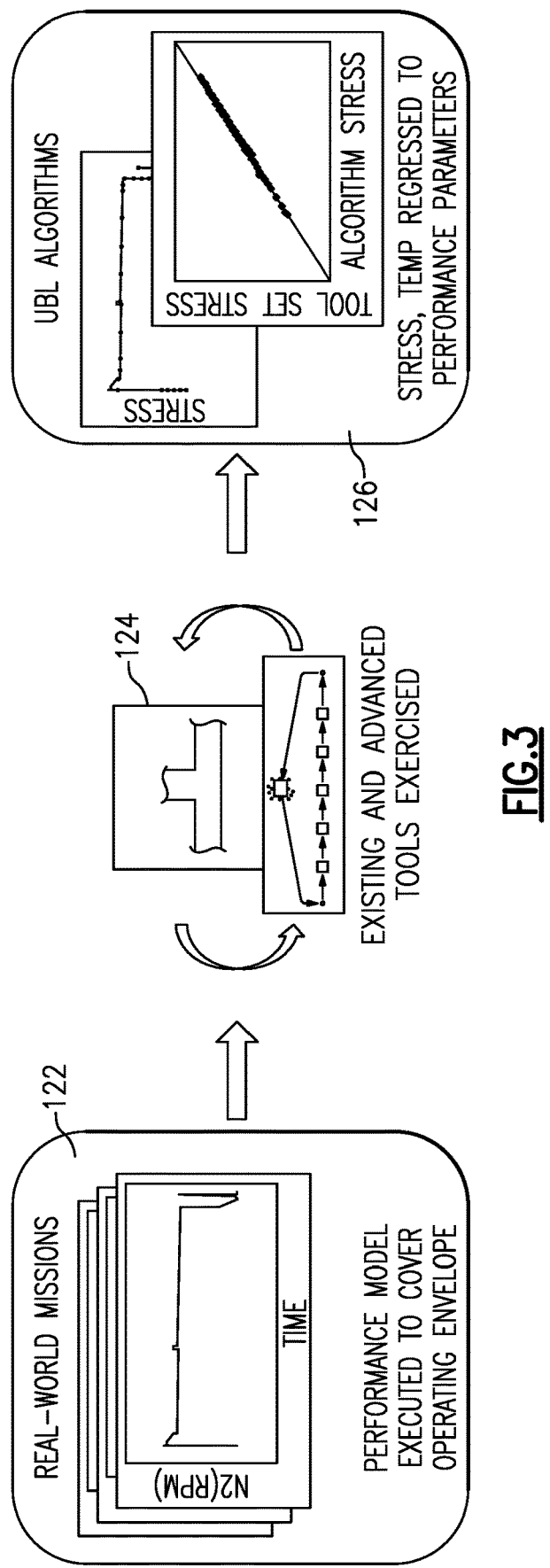
FIG. 3 shows steps in developing algorithms.

As shown at FIG. 3, an initial step is to develop the lifing algorithms for step 110. The algorithms are developed using the design tool set analyses of flights used in component design, real world data 122 or a combination thereof. Thus, real world flights are gathered at 122 and the design tool set is utilized at step 124 to predict the relative effect of each of the real world flights on each of the particular components. As can be appreciated, there are a number of components in any one gas turbine engine which have life limits that must be evaluated based upon such analyses.

The UBL acronym as found in the figures stands for "Usage Based Life."

At step 126, algorithms are developed which can monitor the damage accumulated in each component based upon the different operational conditions the component may see throughout the flight. Algorithms are developed for the effect of temperatures, pressure, speed, etc. Algorithms are developed based upon results obtained from the tool set used for design and analysis of the subject components. The developed algorithms are subsequently validated by comparing the results from the algorithm with those of the design and analysis tool set. The algorithms perform the function of and therefore replace the design and analysis tool set. However, since the algorithms likely have some compensation for their small difference relative to the design tool set, the design and analysis tool set may be used directly in lieu of the algorithms should they be sufficiently economical or efficient to execute.

Figure 4:
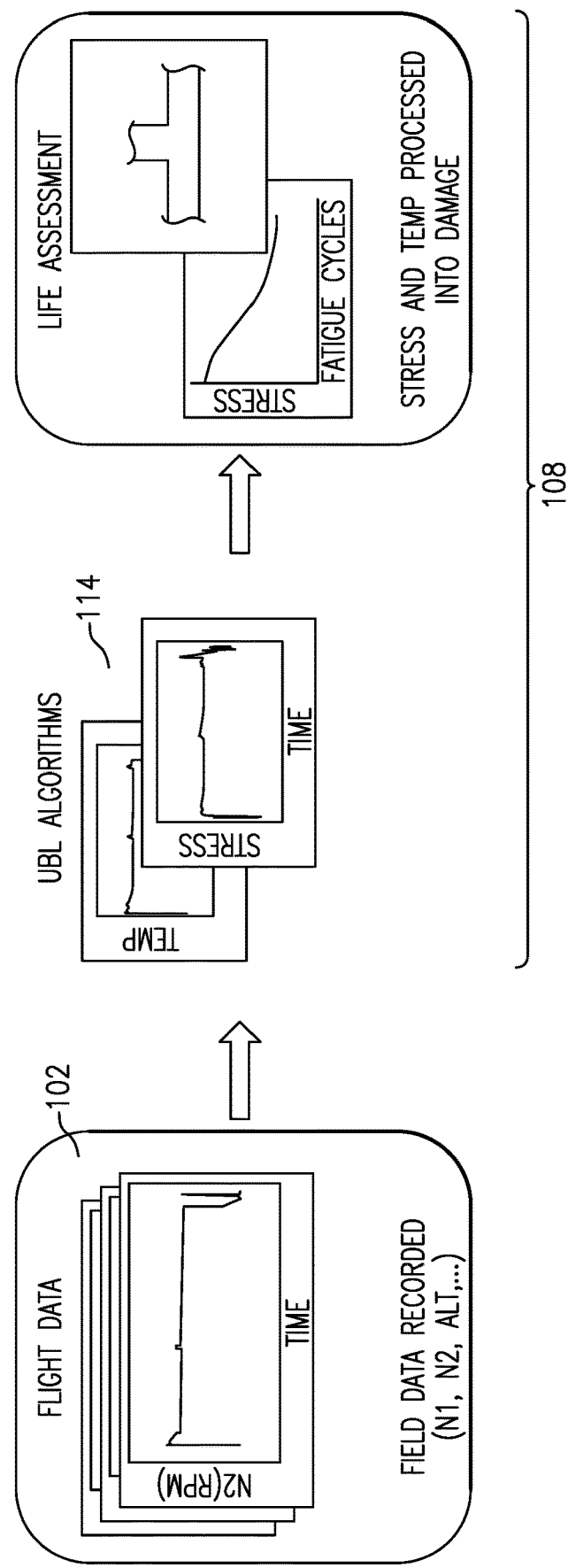
FIG. 4 shows the use of the developed algorithms in combination with the information gained from the FIG. 3 system.

FIG. 4 shows subsequent step. Actual flight data from an engine to be evaluated is gathered at step 102 (see FIG. 2). A particular flight may have more or less damage accumulated on the components. At step 108, the life assessment may then be made utilizing algorithms 114.

Notably, there may sometimes be "missing data" with regard to a flight or a flight portion. As an example, as airlines are moving to this system, it is possible that an engine may have already been in service prior to when the evaluation of this disclosure begins. Thus, there would be a good deal of missing flight information. Secondly, it is possible that the system may sometimes be inoperative or provide sporadic data acquisition. There would be no need to impact the aircraft flying under such conditions, as there are ways to supplement missing information.

Finally, the algorithm usage may be limited to flights which are deemed within the calibration range of the algorithm. It may not be desirable to extrapolate algorithms without independent validation. Thus, a flight outside the algorithm calibration range may require engineering intervention to review and assess whether the algorithm should be expanded, revised, replaced, or perhaps revise the range of applicability. As an example, a flight might occur between a pair of cities for which no algorithm is appropriate.

There are a number of reasons there may be missing data. The means to address missing data may include, but may not be limited to, assuming one or a combination of using the following strategies:

One may utilize a conservative flight assumption. Alternatively, previous data recorded for the same or other airlines on the same or similar flight distances and ambient temperatures could be utilized. This could include a process by which the specific engine health was included within the life assessment process. Alternatively, manual or automatic intervention may be provided in which an analysis is performed using either a design tool set, or an algorithm to understand complex interaction. This may suggest a detailed engineering analysis in lieu of the disclosed algorithms.

The decision to use one or a combination of these options may depend on the extent of missing data. If the amount of missing data is low, then usage of a conservative flight assumption may be expedient and technically conservative. However, as increased data is missing, more complicated assessment processes become more viable and will likely lead to a smart algorithm process which appropriately fills the gaps with acceptable bits of knowledge for life processing.

Figure 5A:
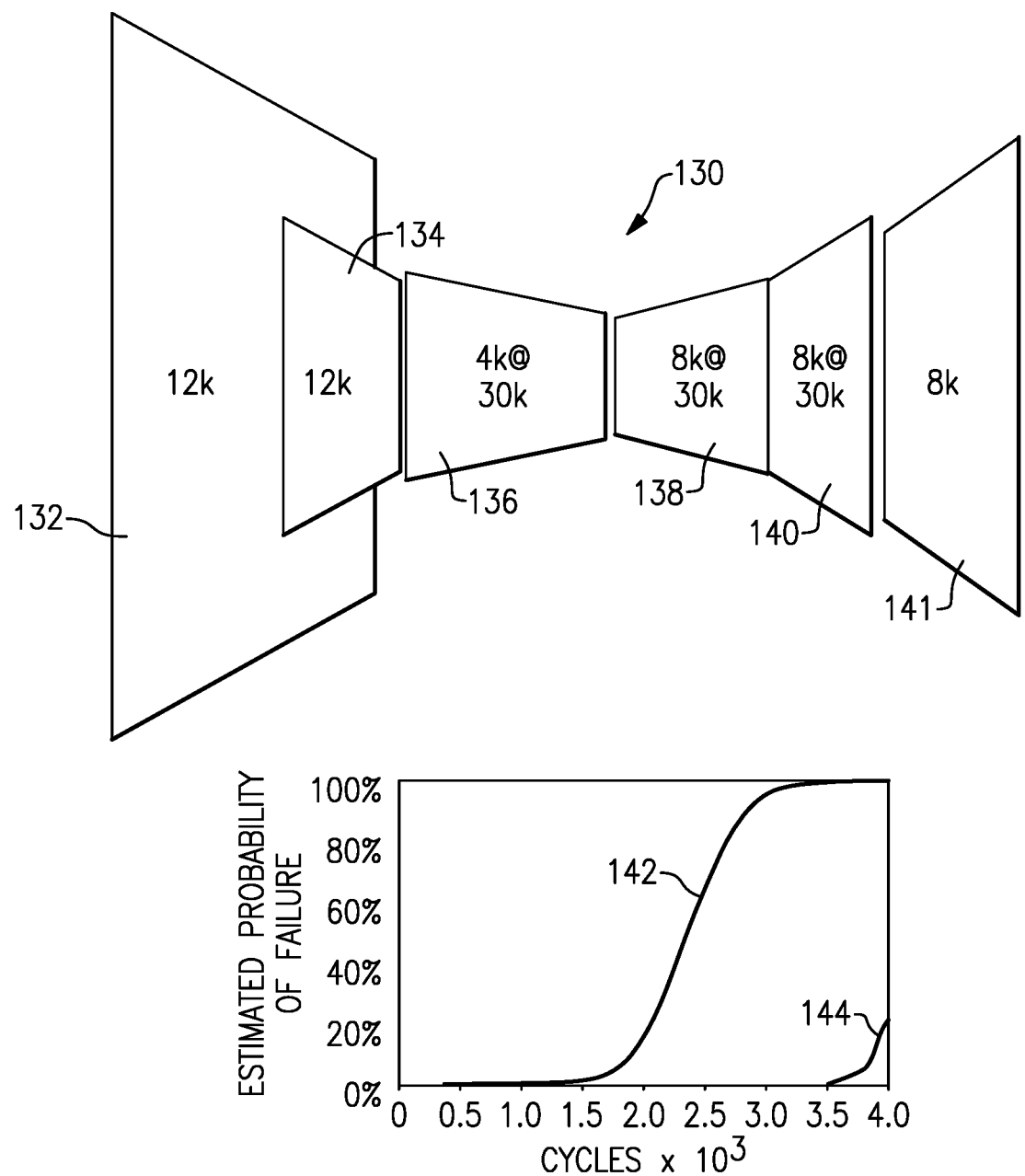
FIG. 5A shows a first example engine.

Not only will more accurate evaluations of the effect of actual flights on an aircraft engine component be developed, but also suggestions may be made to airline operators with regard to placement of particular components to maximize the life of all of the components working together on a particular engine. As an example, in FIG. 5A, an engine 130 is shown. The fan 132 may have 12,000 cycles left. The low pressure compressor 134 may have 12,000 cycles left. The diffuser 138, high pressure turbine 140, and low pressure turbine 141 may have 8,000 cycles left. Notably, the 8,000 cycles are available should the high pressure turbine be operated at 30,000 pounds thrust. The high pressure compressor 136 has 4,000 cycles left.

Thus, this engine has 4,000 cycles left before it will require maintenance. The inventive method and apparatus may be utilized to ensure that the operator is able to get at least 4,000 cycles from the high pressure compressor discs.

Further assume the high pressure compressor 136 is built with repaired blades or vanes that have only a 50 percent probability to reach 4,000 cycles if run at 30,000 pounds thrust due to a known shortcoming of the particular repair on some vanes. Thus, while we can assume the high pressure compressor discs may reach 4,000 cycles, there is a possibility that the repaired vanes in the high pressure compressor may not reach 4,000 cycles.

As shown, a lifing algorithm has been developed for the high pressure compressor. Its chances of not reaching 4,000 cycles are shown at curve 142. Curve 142 assumes 35,000 pound thrust and in hot ambient temperature conditions. On the other hand, the algorithm curve 144 would be for 30,000 pound thrust and at colder ambient conditions. As can be seen, the probability of the high pressure compressor reaching the 4,000 cycles is much greater if that particular component is utilized on an engine operating at the lower thrust load and in colder ambient conditions. Thus, a suggestion may be made to the airline to move that engine to such a route and aircraft configuration.

Figure 5B:
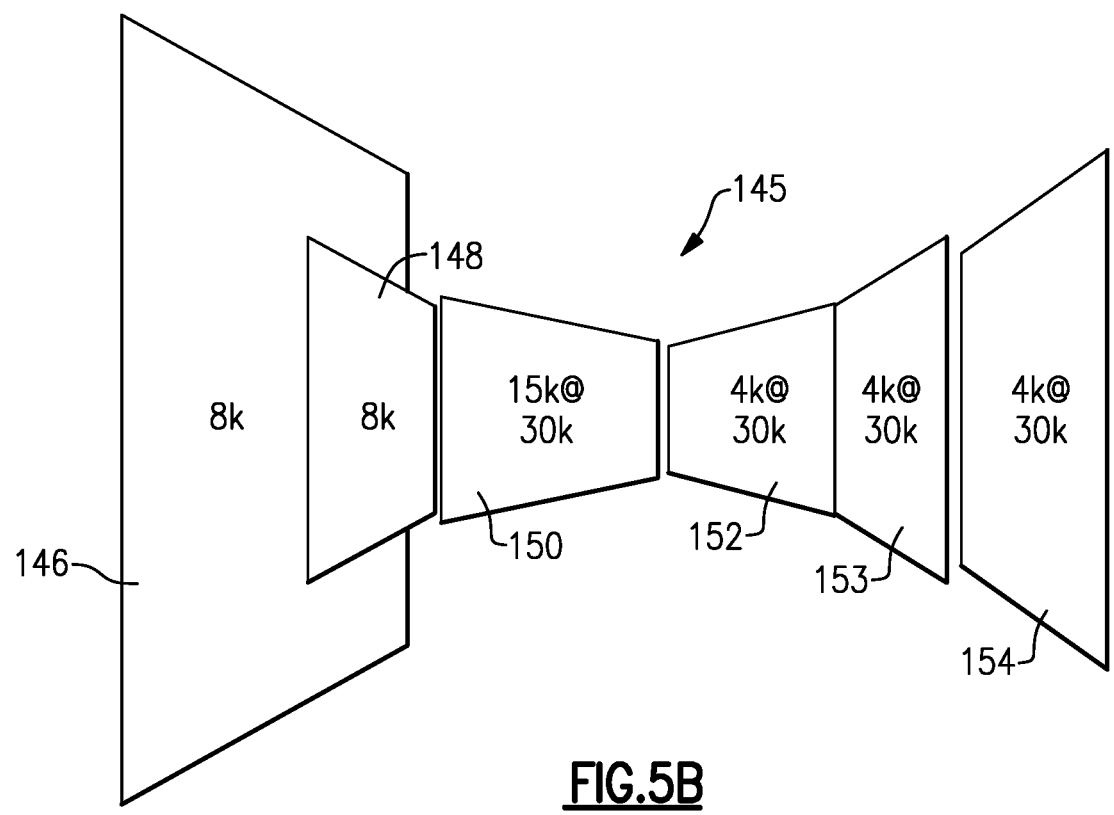
FIG. 5B shows a second example engine.

FIG. 5B shows a second scenario 145. The fan 146 has 8,000 life cycles left. The low pressure compressor 148 has 8,000 cycles left. The high pressure compressor has 15,000 cycles if operated at 30,000 pounds thrust. The diffuser 152 has 4,000 cycles if operated at 30,000 pounds thrust. The high pressure turbine 153 and the low pressure turbine 154, respectively, each have 4,000 cycles at 30,000 pounds thrust.

Assume now that the high pressure turbine 153 is rebuilt with all new airfoils. If this turbine was placed on an engine that would be on an aircraft with lower thrust and in colder temperatures, there is a good likelihood that when the turbine discs reach their mandatory replacement life, there will be a large amount of life left on the turbine airfoils. Thus, a recommendation may be made to the airline that this particular high pressure turbine be assigned to an aircraft for long flights and in a location with hotter ambient temperatures. Now, the high pressure turbine airfoils will likely be closer to their useful life when the engine must be scrapped or otherwise repaired.

As can be appreciated, the disclosed invention provides much more accurate evaluation of the actual remaining life on an aircraft component.

In summary, a method of monitoring a gas turbine engine includes the steps of (a) receiving 104 information from actual flights of an aircraft including an engine to be monitored, and including at least one of ambient temperature at takeoff, internal engine pressures, temperatures and speeds; (b) evaluating the damage accumulated on an engine component 108 given the data received in step (a); (c) storing 112 the determined damage from step (b); (d) repeating steps (a)-(c); and (e) recommending a suggested future use of the component 120 based upon steps (a)-(d).

The information received at step (a) is received remotely at a ground-based evaluation location. The information is streamed off of the aircraft to the ground-based location.

Alternatively, the information is recorded substantially continuously during a flight onboard the aircraft, and received from the aircraft at a later time.

The recommended future use could be replacement or repair. The recommended future use could alternatively include a suggestion to utilize a particular component or engine on a particular type flight. The recommended future use could be use on an engine having a different thrust rating than a current use of the component. The recommended future use could be use on an aircraft flying routes having different average ambient temperatures than a current use.

A component other than the component being monitored may be evaluated along with the component being monitored to identify suggested future use.

In an embodiment, an engine subjected to this method after the engine has already been in flight, and the effect of the earlier missing flights may be supplemented. The supplementation may be provided by a conservative nominal predicted cycle.

Actual flight data information 122 is evaluated to develop algorithms 126 that can then be utilized at step (b) to predict the actual damage on each particular component being monitored.

A maintenance location, such as the airline, receives the suggested future use, acts on it and sends update information about any change back to the system performing steps (a)-(c) to be stored incorporated into step (e).

A system has an ability to receive data about actual flight conditions from an aircraft at a ground-based facility. The system is programmed for including (a) receiving information from actual flights of an aircraft including an engine to be monitored; (b) evaluating the damage accumulated on an engine component given the data received in step (a); (c) storing the determined damage from step (b); (d) repeating steps (a)-(c); and (e) recommending a suggested future use for the component based upon steps (a)-(d).

It is known that the type of components having a limited cyclic life are known as "engine life limited parts." Generally, these are parts which are difficult to contain should they fail. As such, there is a requirement that their life is limited to a particular number of cycles. In general, Chapter 5 "engine life limited parts" are rotating parts with full hoop geometry such as disks or rotating seals. On the other hand, there are static parts which are also life limited and included within Chapter 5. These Chapter 5 type parts are one classification of components being evaluated with the disclosed method, in preferred embodiments.

Of course, this disclosure may provide benefits in non-life limited parts also. As examples, the engine components may include blades or vanes.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of monitoring a gas turbine engine comprising the steps of:
   (a) receiving information from actual flights of an aircraft including an engine to be monitored, and including at least one of the ambient temperature at takeoff, and internal engine pressures, temperatures and speeds;
   (b) evaluating the damage accumulated on an engine component given the data received in step (a);
   (c) storing the determined damage from step (b);
   (d) repeating steps (a)(c);
   (e) recommending a suggested future use for the component based upon steps (a)-(d);
   wherein the storing of step (c) is supplemented to provide information on missing flight information.

2. The method as set forth in claim 1, wherein the information received at step (a) is received remotely at a ground-based evaluation location.

3. The method as set forth in claim 2, wherein the information is streamed off of the aircraft to the ground-based location.

4. The method as set forth in claim 2, wherein the information is recorded substantially continuously during a flight onboard the aircraft, and received from the aircraft at a later time.

5. The method as set forth in claim 1, wherein the recommended future use includes a suggestion to utilize a particular component or engine on a particular type flight.

6. The method as set forth in claim 5, wherein the particular type flight is on an engine having a different thrust rating than a current use of the component.

7. The method as set forth in claim 5, wherein the particular flight is for use on an aircraft flying routes having a distinctly different ambient temperature than current use.

8. The method as set forth in claim 1, wherein a component other than the component being monitored is evaluated along with the component being monitored to identify the suggested future use.

9. The method as set forth in claim 1, wherein the supplementation is provided by a conservative nominal predicted cycle.

10. The method as set forth in claim 1, wherein actual flight data information is evaluated to develop algorithms that can then be utilized at step (b) to predict the actual damage accumulated on said component being monitored.

11. The method as set forth in claim 1, wherein a maintenance facility receives the suggested future use and takes an action on the component.

12. The method as set forth in claim 11, wherein the action is reported back to be stored and utilized at least in step (e).

13. The method as set forth in claim 1, wherein steps (a)-(e) are performed on an aircraft including the engine being monitored.

14. The method as set forth in claim 1, wherein the engine component is an engine life limited part.

15. The method as set forth in claim 1, wherein the suggested future use is transmitted to a maintenance facility.

16. A system comprising:
   a ground-based evaluation system programmed to perform the following steps:
   (a) receiving information from actual flights of an aircraft including an engine to be monitored, and including at least one of the ambient temperature at takeoff, and internal engine pressures, temperatures and speeds;
   (b) evaluating the damage accumulated on an engine component given the data received in step (a);
   (c) storing the determined damage from step (b);
   (d) repeating steps (a)-(c);
   (e) recommending a suggested future use for the component based upon steps (a)-(d);
   wherein the storing of step (c) is supplemented to provide information on missing flight information.

17. The system as set forth in claim 16, wherein a component other than the component being monitored is evaluated along with the component being monitored to identify the suggested future use.

18. The system as set forth in claim 16, wherein actual flight data information is evaluated to develop algorithms that can then be utilized at step (b) to predict the actual damage accumulated on each particular component being monitored.

19. The system as set forth in claim 16, wherein steps (a)-(e) are performed on an aircraft including the engine being monitored.

20. The system as set forth in claim 16, wherein the supplementation is provided by a conservative nominal predicted cycle.

21. A method of monitoring a gas turbine engine comprising the steps of:
  (a) receiving information from actual flights of an aircraft including an engine to be monitored, and including at least one of the ambient temperature at takeoff, and internal engine pressures, temperatures and speeds;
  (b) evaluating the damage accumulated on an engine component given the data received in step (a);
  (c) storing the determined damage from step (b);
  (d) repeating steps (a)-(c);
  (e) recommending a suggested future use for the component based upon steps (a)-(d);
  wherein the recommended future use includes a suggestion to utilize a particular component or engine on a particular type flight.

* * * * *